(12) United States Patent
Katsumoto et al.

(10) Patent No.: US 11,553,094 B2
(45) Date of Patent: Jan. 10, 2023

(54) ELECTRONIC DEVICE CAPABLE OF DETECTING OCCURRENCE OF ABNORMAL NOISE

(71) Applicant: KYOCERA Document Solutions Inc., Osaka (JP)

(72) Inventors: Kaori Katsumoto, Osaka (JP); Lin Lu, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 17/693,177

(22) Filed: Mar. 11, 2022

(65) Prior Publication Data

US 2022/0294911 A1    Sep. 15, 2022

(30) Foreign Application Priority Data

Mar. 11, 2021 (JP) .............................. JP2021-039582

(51) Int. Cl.
*H04N 1/00* (2006.01)
(52) U.S. Cl.
CPC ..... *H04N 1/00037* (2013.01); *H04N 1/00074* (2013.01); *H04N 2201/0094* (2013.01)
(58) Field of Classification Search
CPC ............. G03G 15/5033; G03G 15/505; G03G 15/757; G03G 21/1671; H04N 1/00007; H04N 1/00029; H04N 1/00058; H04R 1/08; H04R 1/326; H04R 2227/003; H04R 2499/11; H04R 27/00; H04R 29/00; H04R 3/00

USPC ......................................................... 358/1.14
See application file for complete search history.

(56) References Cited

U.S. PATENT DOCUMENTS

| | | | | |
|---|---|---|---|---|
| 11,237,511 B2 * | 2/2022 | Tsubotani | .............. | G03G 15/55 |
| 11,301,181 B2 * | 4/2022 | Lu | ...................... | H04N 1/00074 |
| 2012/0183313 A1 | 7/2012 | Kurimoto et al. | | |
| 2016/0112602 A1 * | 4/2016 | Kawai | ................ | H04N 1/00029 358/1.14 |
| 2017/0017449 A1 * | 1/2017 | Udaka | ................ | H04N 1/00244 |

(Continued)

FOREIGN PATENT DOCUMENTS

| | | |
|---|---|---|
| AU | 2016378005 A1 | 5/2018 |
| JP | 2012145806 A | 8/2012 |

(Continued)

*Primary Examiner* — Negussie Worku
(74) *Attorney, Agent, or Firm* — IP Business Solutions, LLC

(57) ABSTRACT

In an image forming apparatus, a controller allows a sound output device to output a starting sound and an ending sound at a start and end of diagnostic image formation processing, respectively, determines whether abnormal noise has occurred by identifying data ranging from the starting sound to the ending sound in an diagnostic spectrogram as a comparison target for data ranging from the starting sound to the ending sound in a normal spectrogram to match both the spectrograms in terms of width in a time-axis direction, and identifies a source of the abnormal noise by identifying the data ranging from the starting sound to the ending sound in the diagnostic spectrogram as a comparison target for data in ranging from a timing of start to a timing of end in a timing chart to match the diagnostic spectrogram with the timing chart in terms of width in the time-axis direction.

8 Claims, 8 Drawing Sheets

(56) References Cited

U.S. PATENT DOCUMENTS

| | | | |
|---|---|---|---|
| 2017/0201824 A1 | 7/2017 | Okamoto et al. | |
| 2019/0187601 A1* | 6/2019 | Seki | H04R 1/08 |
| 2020/0076959 A1* | 3/2020 | Takahashi | H04N 1/00074 |
| 2020/0120217 A1* | 4/2020 | Xu | H04N 1/00037 |
| 2020/0249610 A1* | 8/2020 | Tsubotani | G06K 15/14 |
| 2021/0014382 A1* | 1/2021 | Nakazawa | H04N 1/409 |
| 2021/0311670 A1* | 10/2021 | Lu | H04N 1/00029 |

FOREIGN PATENT DOCUMENTS

| | | |
|---|---|---|
| JP | 2017122664 A | 7/2017 |
| JP | 2018051983 A | 4/2018 |
| JP | 2019158661 A | 9/2019 |
| WO | 2017094270 A1 | 6/2017 |
| WO | 2017110111 A1 | 6/2017 |
| WO | 2017115475 A1 | 7/2017 |

* cited by examiner

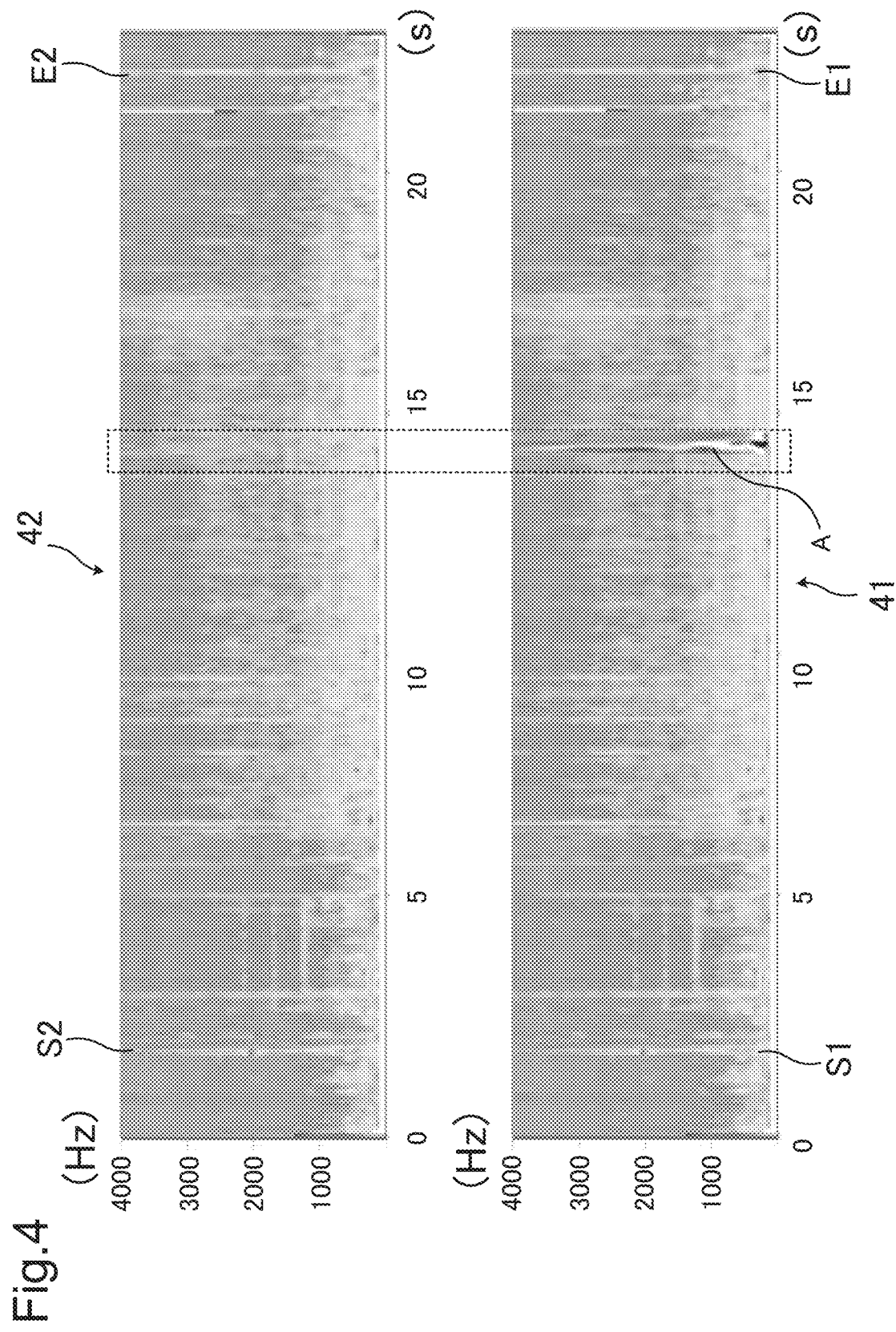

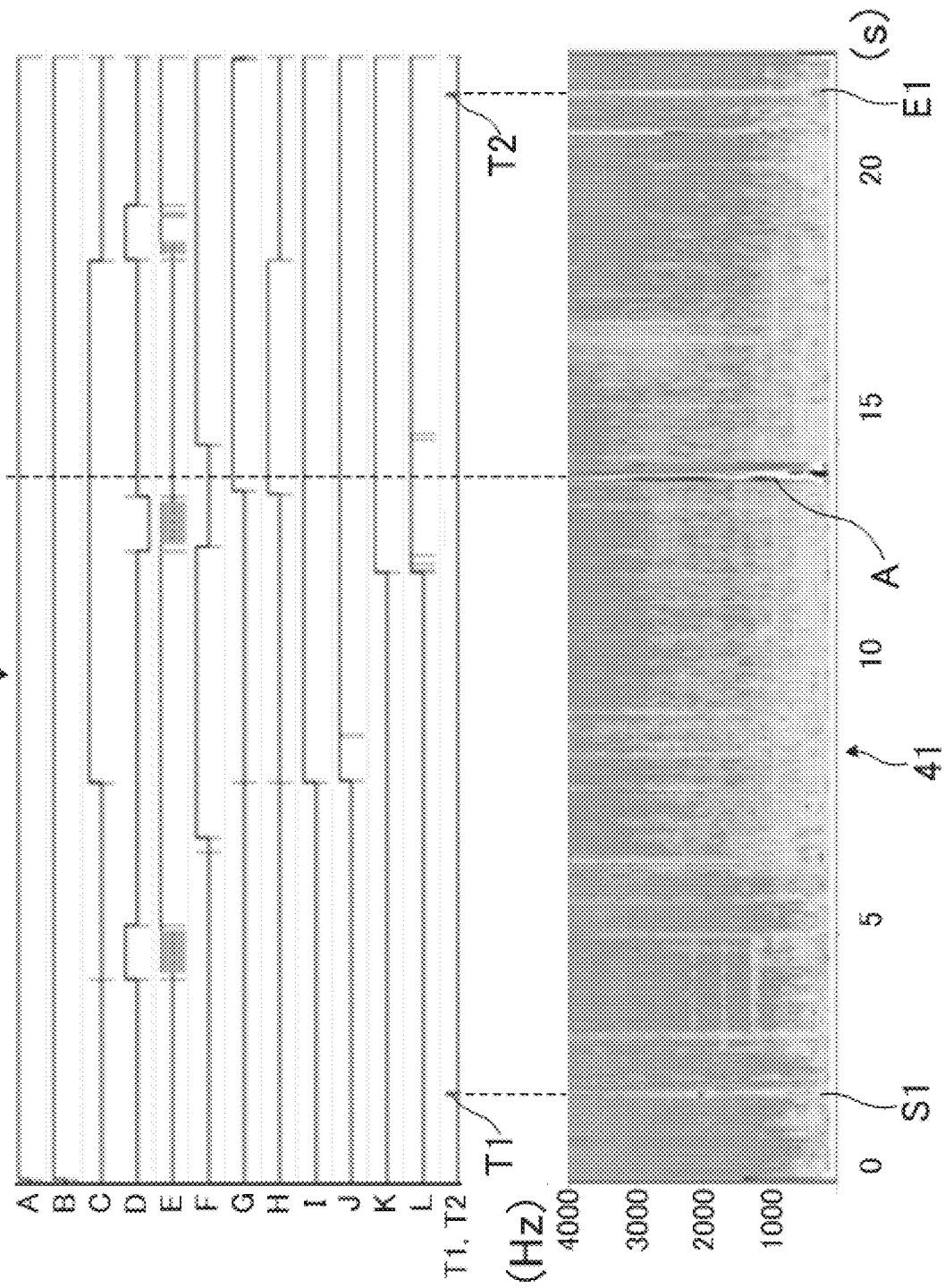

ELECTRONIC DEVICE CAPABLE OF DETECTING OCCURRENCE OF ABNORMAL NOISE

INCORPORATION BY REFERENCE

This application claims priority to Japanese Patent Application No. 2021-039582 filed on Mar. 11, 2021, the entire contents of which are incorporated by reference herein.

BACKGROUND

The present disclosure relates to electronic devices and particularly relates to a technique for detecting the occurrence of abnormal noise.

There is known a technique for collecting operating noise of an operating body with a microphone and determining, using operating noise data representing the operating noise, whether or not abnormal noise has occurred.

For example, a technique is disclosed in which a cause of abnormal noise is identified based on frequency spectral waveform data obtained from noise information representing abnormal noise generated in an image forming apparatus and recording position information.

For another example, a technique is disclosed in which frequency spectral waveform data obtained from noise information representing abnormal noise generated in an image forming apparatus and frequency spectral waveform data as a comparison target are displayed side by side on a display device and the position of display of one of the obtained data and the comparison data is changed in the direction of the time axis based on a user's operation.

A technique is also disclosed for emitting a beep sound at the start of recording of noise generated from a diagnostic target and using, as diagnostic data, data obtained by removing the beep sound from recorded noise data.

Another disclosed technique is to drive a photoconductor with a different timing and at a different linear velocity from during normal image formation processing and predict the occurrence of abnormal noise based on noise around the photoconductor detected with a microphone during operation of the photoconductor.

Still another disclosed technique is to identify occurrence of abnormal noise and a cause of abnormal noise using diagnostic data acquired by bringing a terminal device with a microphone close to a location of occurrence of abnormal noise in an image forming apparatus and recording noise around the location.

Still another disclosed technique is to determine a failure of a task when it is possible to determine, based on operating noise data representing a waveform of sound wave input to a microphone and an abnormal noise pattern representing a sound waveform pattern to be produced upon task failure, that noise upon task failure has been emitted.

Still another disclosed technique is to determine the presence or absence of abnormality in a cleaning blade by analyzing collected operating noise data representing operating noise of the cleaning blade input to a microphone and comparing the result of analysis of the collected operating noise data with predetermined noise profile data.

SUMMARY

A technique improved over the aforementioned techniques is proposed as one aspect of the present disclosure.

An electronic device according to an aspect of the present disclosure includes a plurality of operating bodies, a noise collecting device, a storage device, a sound output device, a display device, and a control device. The plurality of operating bodies sequentially operate at predetermined time intervals to execute predetermined processing. The noise collecting device collects operating noise of the plurality of operating bodies during execution of the processing and outputs operating noise data representing the collected operating noise. The storage device previously stores: a normal spectrogram representing operating noise of the plurality of operating bodies during execution of the processing in a predetermined normal condition, inclusive of a starting sound indicating a timing of start of the processing and an ending sound indicating a timing of end of the processing; and a timing chart showing operation timings of the plurality of operating bodies during normal execution of the processing, together with the timing of start of the processing and the timing of end of the processing. The sound output device outputs a sound. The control device includes a processor and functions as a controller through the processor executing a control program. The controller subjects the operating noise data to frequency analysis to acquire a spectrogram, determines whether or not abnormal noise has occurred based on a difference between the acquired spectrogram and the normal spectrogram with a predetermined timing, makes a comparison, upon determination that abnormal noise has occurred, between the acquired spectrogram and the timing chart to identify an operating body being a source of the abnormal noise, allows the display device to display a screen showing the identified source of the abnormal noise, and, upon determination that no abnormal noise has occurred, keeps the display device from displaying the screen. The controller performs to: (i) allow the sound output device to output the starting sound at a start of the processing and output the ending sound at an end of the processing; (ii) determine whether or not abnormal noise has occurred by identifying data in a time range from the starting sound to the ending sound in the acquired spectrogram as a comparison target for data in a time range from the starting sound to the ending sound in the normal spectrogram to match the acquired spectrogram with the normal spectrogram in terms of width in a direction of a time axis; and (iii) identify the operating body being the source of the abnormal noise by identifying the data in the time range from the starting sound to the ending sound in the acquired spectrogram as a comparison target for data in a time range from the timing of start of the processing to the timing of end of the processing in the timing chart to match the acquired spectrogram with the timing chart in terms of width in the direction of the time axis.

BRIEF DESCRIPTION OF THE DRAWINGS

FIG. 4 is a view showing an example of first identification processing.

FIG. 5 is a view showing an example of second identification processing.

DETAILED DESCRIPTION

Figure 1:
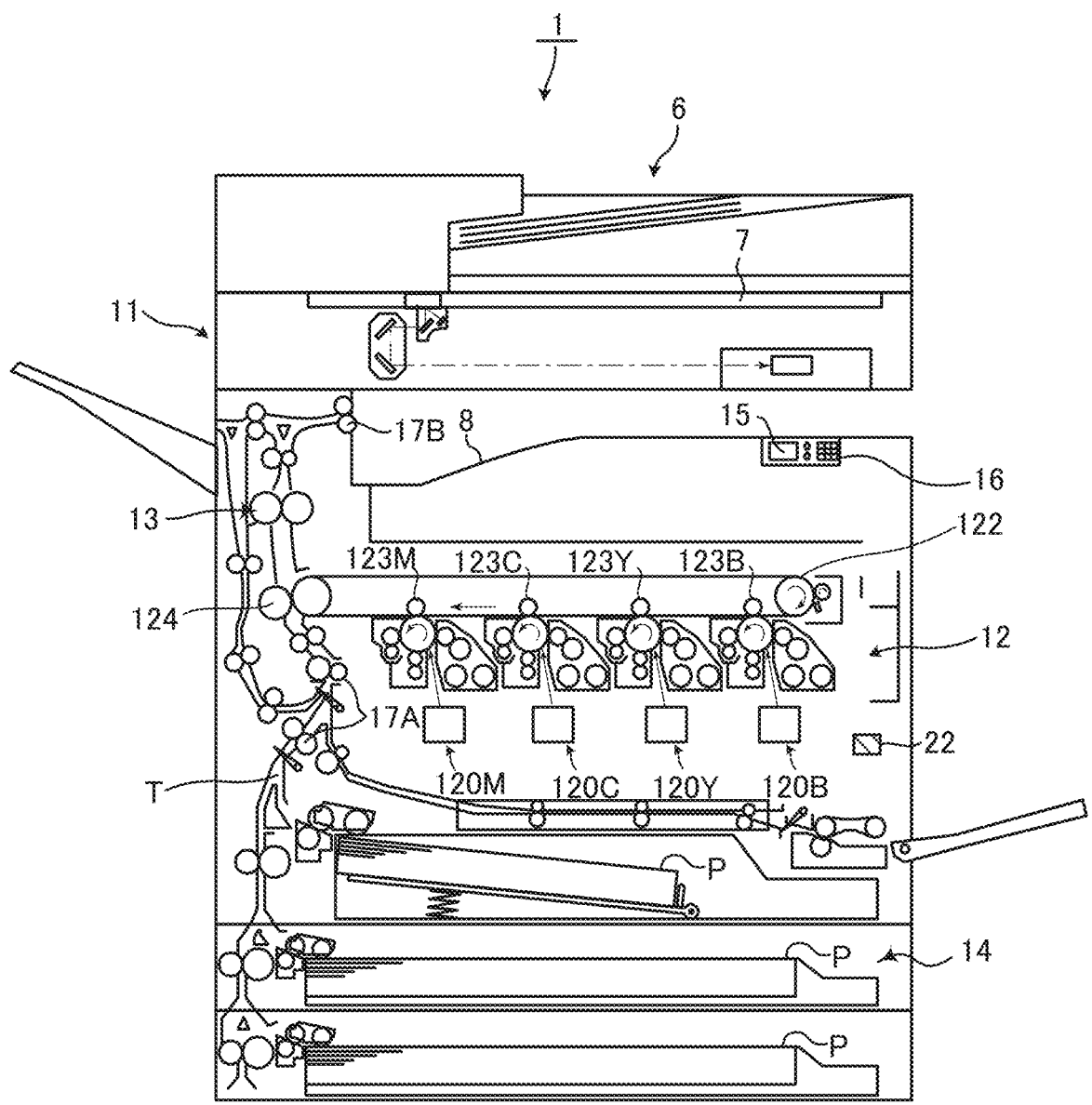
FIG. 1 is a frontal cross-sectional view showing the structure of an image forming apparatus according to one embodiment of the present disclosure.
Figure 2:
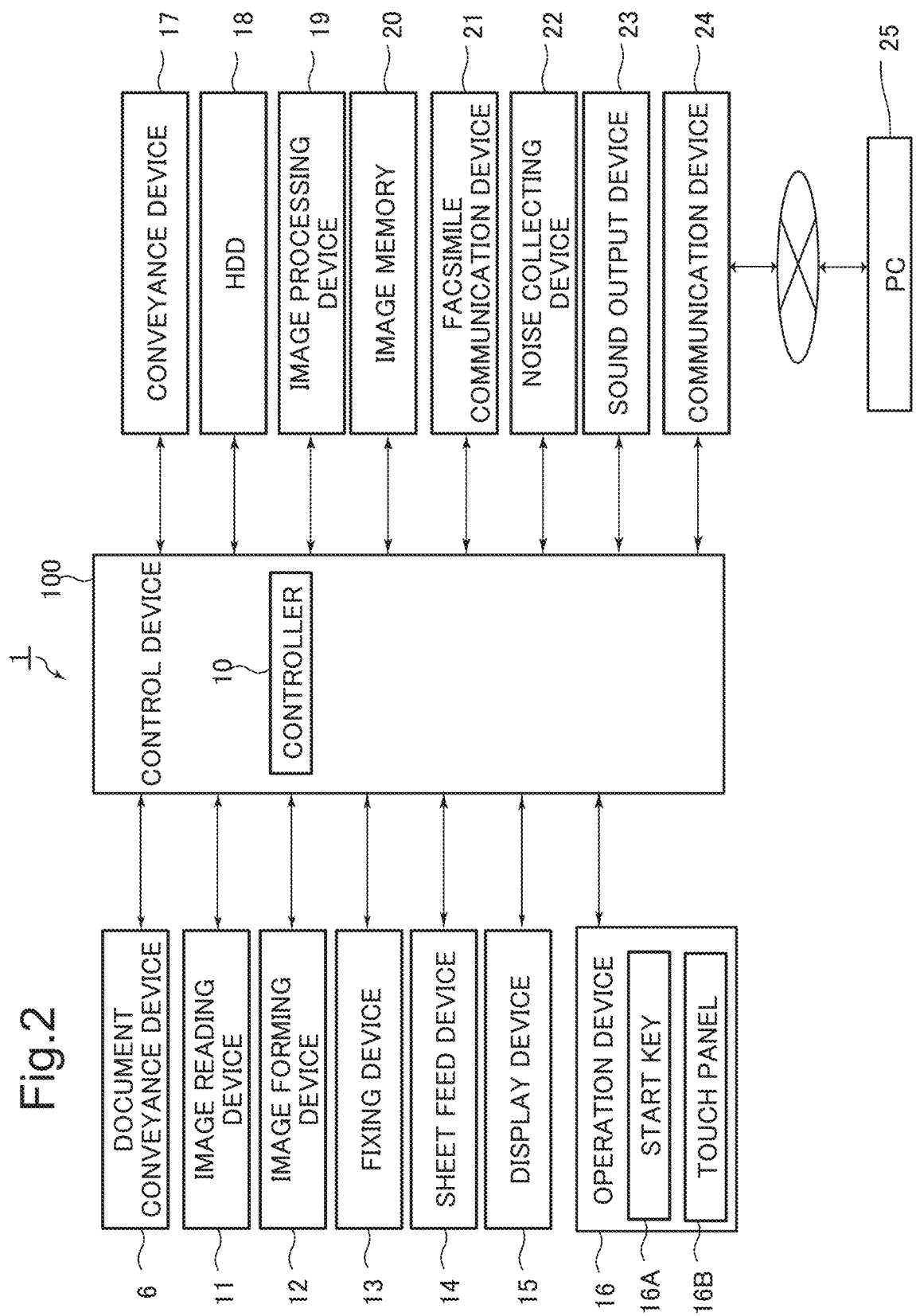
FIG. 2 is a block diagram showing an internal configuration of the image forming apparatus.

Hereinafter, a description will be given of an image forming apparatus as an electronic device according to one embodiment of the present disclosure with reference to the drawings. FIG. 1 is a frontal cross-sectional view showing the structure of an image forming apparatus according to one embodiment of the present disclosure. FIG. 2 is a block diagram showing an internal configuration of the image forming apparatus.

Referring to FIGS. 1 and 2, an image forming apparatus 1 is a multifunction peripheral having a plurality of functions, including a copy function, a transmission function, a print function, and a facsimile function. A housing of the image forming apparatus 1 contains a plurality of devices for use in implementing various functions of the image forming apparatus 1. The housing contains, for example, an image reading device 11, an image forming device 12, a fixing device 13, a sheet feed device 14, and so on.

The image forming apparatus 1 includes a control device 100. The control device 100 includes a processor, a RAM (random access memory), a ROM (read only memory), and so on. The processor is, for example, a CPU (central processing unit), an MPU (micro processing unit), an ASIC (application specific integrated circuit) or the like.

When a control program stored in the ROM or an HDD 18 is executed by the above processor, the control device 100 functions as a controller 10. The controller 10 governs the overall operation control of the image forming apparatus 1. More specifically, the controller 10 controls the operations of the devices constituting the image forming apparatus 1 and communications with a PC (personal computer) 25 and other devices connected via a network. Alternatively, the controller 10 may not be implemented by the operation of the processor in accordance with the above control program, but may be constituted by a logic circuit.

When operating in accordance with a diagnosis program to be described later, the controller 10 executes abnormal noise diagnosis processing for subjecting operating noise data representing operating noise of a plurality of operating bodies during execution of diagnostic image formation processing to CWT (continuous wavelet transform) conversion to acquire a diagnostic spectrogram, determining whether or not abnormal noise has occurred based on a difference between the acquired diagnostic spectrogram and a normal spectrogram, making a comparison, upon determination that abnormal noise has occurred, between the diagnostic spectrogram and a timing chart to identify an operating body being a source of the abnormal noise, and allowing a display device 15 to display a screen showing the identified source of the abnormal noise. The diagnostic spectrogram is an example of the acquired spectrogram in the CLAIMS.

Herein, the diagnostic image formation processing refers to processing for forming a predetermined image on one page of a recording paper sheet P of a predetermined standard (for example, a plain paper of A4 size). The above-described plurality of operating bodies sequentially operate at predetermined time intervals to execute the diagnostic image formation processing.

The control device 100 is electrically connected to a document conveyance device 6, the image reading device 11, the image forming device 12, the fixing device 13, the sheet feed device 14, the display device 15, an operation device 16, a conveyance device 17, an HDD 18, an image processing device 19, an image memory 20, a facsimile communication device 21, a noise collecting device 22, a sound output device 23, a communication device 24, and so on.

The image reading device 11 is an ADF (auto document feeder) including: a document conveyance device 6 that conveys an original document placed on a document loading chute; and a scanner that optically reading an original document conveyed by the document conveyance device 6 or an original document placed on a platen glass 7. The image reading device 11 irradiates the original document with light from a lighting part, receives light reflected from the original document on a CCD (charge-coupled device) sensor to read an image of the original document, and thus generates image data representing the image of the original document.

The image forming device 12 includes, an image formation unit 120B for black, an image formation unit 120Y for yellow, an image formation unit 120C for cyan, an image formation unit 120M for magenta, an intermediate transfer belt 122, and a secondary transfer roller 124. Hereinafter, the image formation units 120B, 120Y, 120C, and 120B may also be collectively referred to as "image formation units 120". The image formation units 120 include, as part of the above-described plurality of operating bodies, respective developing devices, respective photosensitive drums, respective charging devices, respective exposure devices, respective primary transfer rollers 123B, 123Y, 123C, and 123M, a secondary transfer roller 124, and so on.

The image formation units 120B, 120Y, 120C, and 120M use respective toners supplied from their respective developing devices for different colors to form respective toner images of different colors based on image data generated by the image reading device 11 or like data and transfer the formed toner images of different colors to the surface of the intermediate transfer belt 122 with their respective primary transfer rollers 123B, 123Y, 123C, and 123M to superpose the toner images one on another. The secondary transfer roller 124 transfers the multicolor toner image formed on the surface of the intermediate transfer belt 122 to a recording paper sheet P being conveyed along a conveyance path T by the conveyance device 17.

The fixing device 13 includes a fixing roller and a pressure roller which are part of the above plurality of operating bodies. The fixing device 13 applies heat and pressure to the recording paper sheet P having the toner image formed thereon by the image forming device 12, thus fixing the toner image on the recording paper sheet P. The recording paper sheet P having the toner image fixed thereon by the fixing device 13 is discharged to a sheet output tray 8.

The sheet feed device 14 includes a manual feed tray and a plurality of sheet feed cassettes. The sheet feed device 14 pulls out recording paper sheets P contained in one of the plurality of sheet feed cassettes or recording paper sheets placed on the manual feed tray, sheet by sheet, with a pick-up roller serving as part of the plurality of operating bodies and feeds forward the pulled-out recording paper sheet to the conveyance path T.

The display device 15 is a display device composed of a liquid crystal display, an organic EL (an organic light-emitting diode) display or the like. Under the control of the controller 10, the display device 15 displays, on its display area, various screen images related to various functions executable by the image forming apparatus 1.

The operation device 16 includes a plurality of hard keys, such as a Start key 16A for instructing the start of execution of various types of processing. The operation device 16 further includes a touch panel 16B superposed on the top of the display device 15. Thus, the user can input through the operation device 16 various information, including instructions for various functions executable by the image forming apparatus 1.

The conveyance device 17 includes, as part of the above plurality of operating bodies, rollers, such as conveyance roller pairs 17A and an ejection roller pair 17B, and a conveyance motor connected to the rollers including the conveyance roller pairs 17A and the ejection roller pair 17B. The controller 10 drives the conveyance motor to rotate the rollers including the conveyance roller pairs 17A and the ejection roller pair 17B, thus allowing the rollers to convey the recording paper sheet P, which has been fed by the sheet feed device 14, toward the image forming device 12 and the sheet output tray 8 along the conveyance path T.

The HDD 18 is a large storage device for use in storing various types of data, including image data generated by the image reading device 11. The HDD 18 stores various control programs for implementing general operations of the image forming apparatus 1. The HDD 18 holds, as one of the various control programs, a diagnosis program for executing abnormal noise diagnosis processing according to the one embodiment of the present disclosure.

The HDD 18 previously stores a normal spectrogram representing operating noise of the plurality of operating bodies during execution of the diagnostic image formation processing in a predetermined normal condition, inclusive of a starting sound indicating a timing of start of the diagnostic image formation processing and an ending sound indicating a timing of end of the diagnostic image formation processing. The predetermined normal condition refers to a condition where no abnormality, such as failure, occurs in all the plurality of operating bodies. The normal spectrogram is preferably a spectrogram representing operating noise in diagnostic image formation processing executed at the factory or just after the installation of the image forming apparatus 1. The HDD 18 is an example of the storage device defined in CLAIMS.

The HDD 18 further previously stores a timing chart showing operation timings of the plurality of operating bodies during normal execution of the diagnostic image formation processing, together with the timing of start of the processing and the timing of end of the processing. For example, a timing chart 51 shown in FIG. 5 shows operation timings A to L, the timing of start T1, and the timing of end T2. In this example, the operation timings A and B are operation start timings of thermistors, the operation timings C, I, and J are operation start timings of polygon motors, and operation timings G and H are timings of application of a transfer voltage to the primary transfer rollers 123B, 123Y, 123C, and 123M.

The HDD 18 further previously stores: starting sound data representing a predetermined starting sound indicating the timing of start of the diagnostic image formation processing; and ending sound data representing a predetermined ending sound indicating the timing of end of the diagnostic image formation processing.

The image processing device 19 performs, as necessary, image processing of image data generated by the image reading device 11. The image memory 20 includes a region that temporarily stores image data generated by the image reading device 11. The facsimile communication device 21 performs connection to a public line and transfers image data to and from other facsimile devices via the public line.

The noise collecting device 22 is provided near the image forming device 12 in the interior of the housing of the image forming apparatus 1. The noise collecting device 22 includes: a microphone to which operating noise is input; and an A/D conversion circuit that converts analog signals based on operating noise input to the microphone to digital signals. The noise collecting device 22 collects operating noise of the above-described plurality of operating bodies during execution of the diagnostic image formation processing and outputs operating noise data representing the operating noise.

The sound output device 23 includes a D/A conversion circuit that converts a digital signal represented by sound data to an analog signal, a speaker that outputs a sound based on the analog signal obtained by the conversion, an amplifier, and so on.

The communication device 24 includes a communication module, such as a LAN (local area network) board. The image forming apparatus 1 performs data communications through the communication device 24 with the PC 25 or other devices connected thereto via the network.

Each of the devices constituting the image forming apparatus 1 is connected to a power supply and operates on electric power supplied from the power supply.

[Operation of Image Forming Apparatus 1]

Figure 3A:
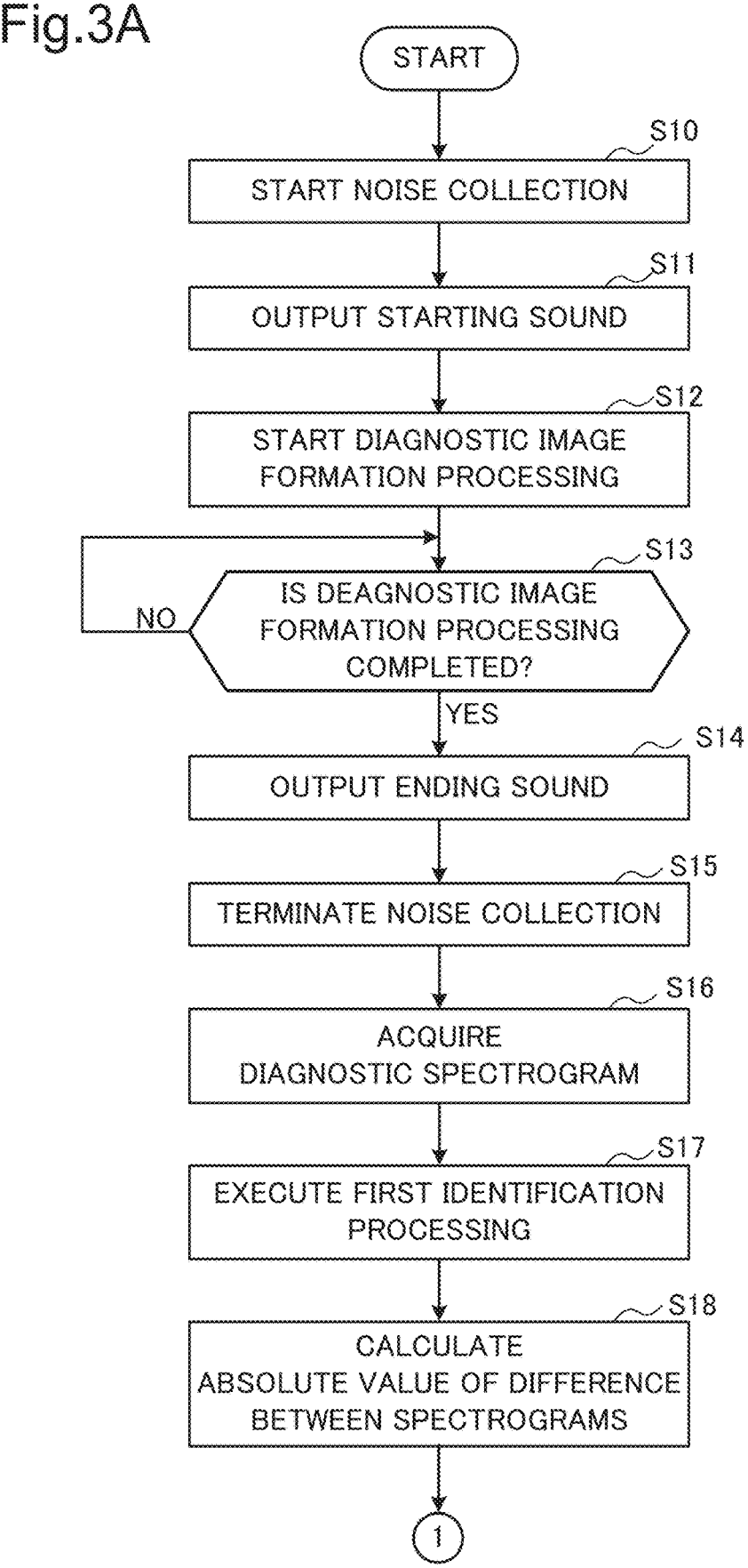
FIG. 3A is a portion of a flowchart showing abnormal noise diagnosis processing.
Figure 3B:
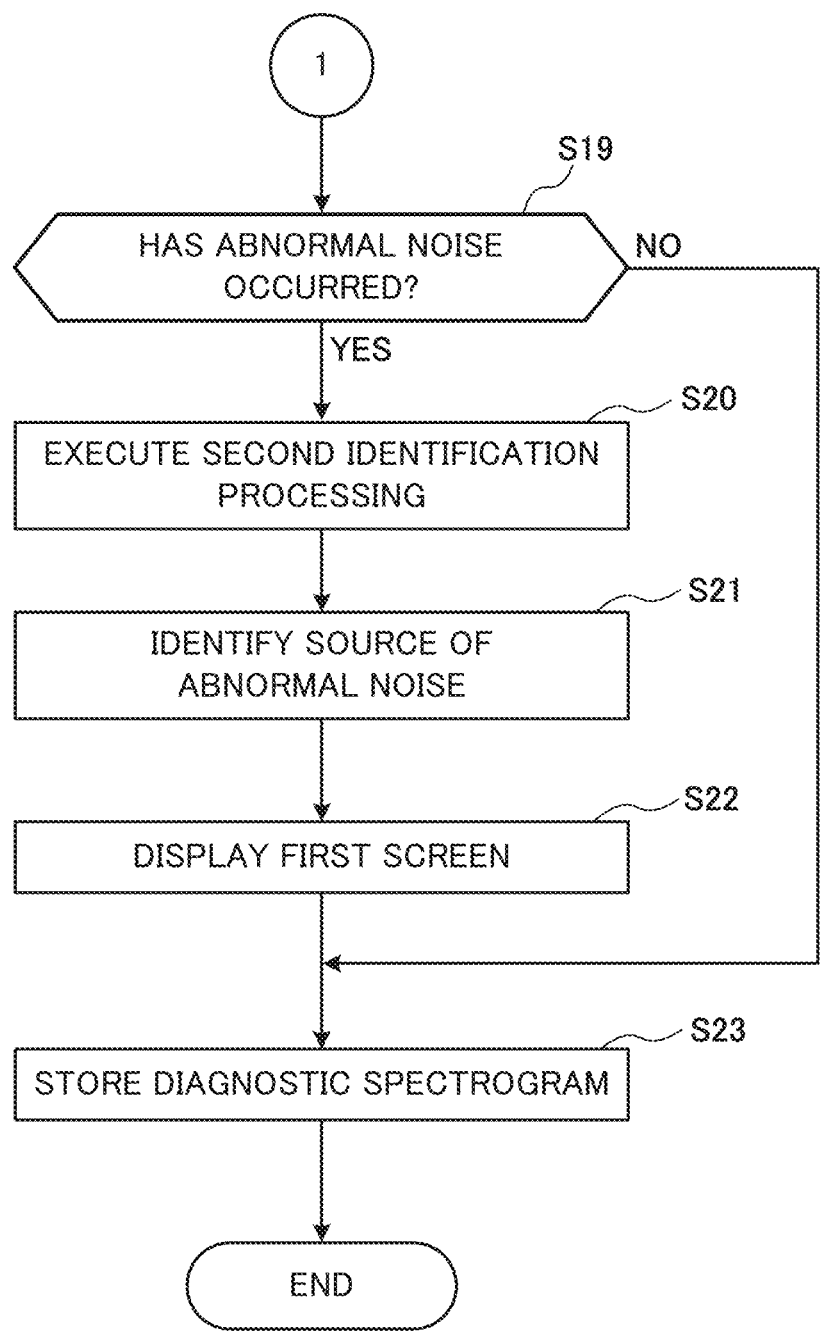
FIG. 3B is the rest of the flowchart showing the abnormal noise diagnosis processing.
Figure 6:
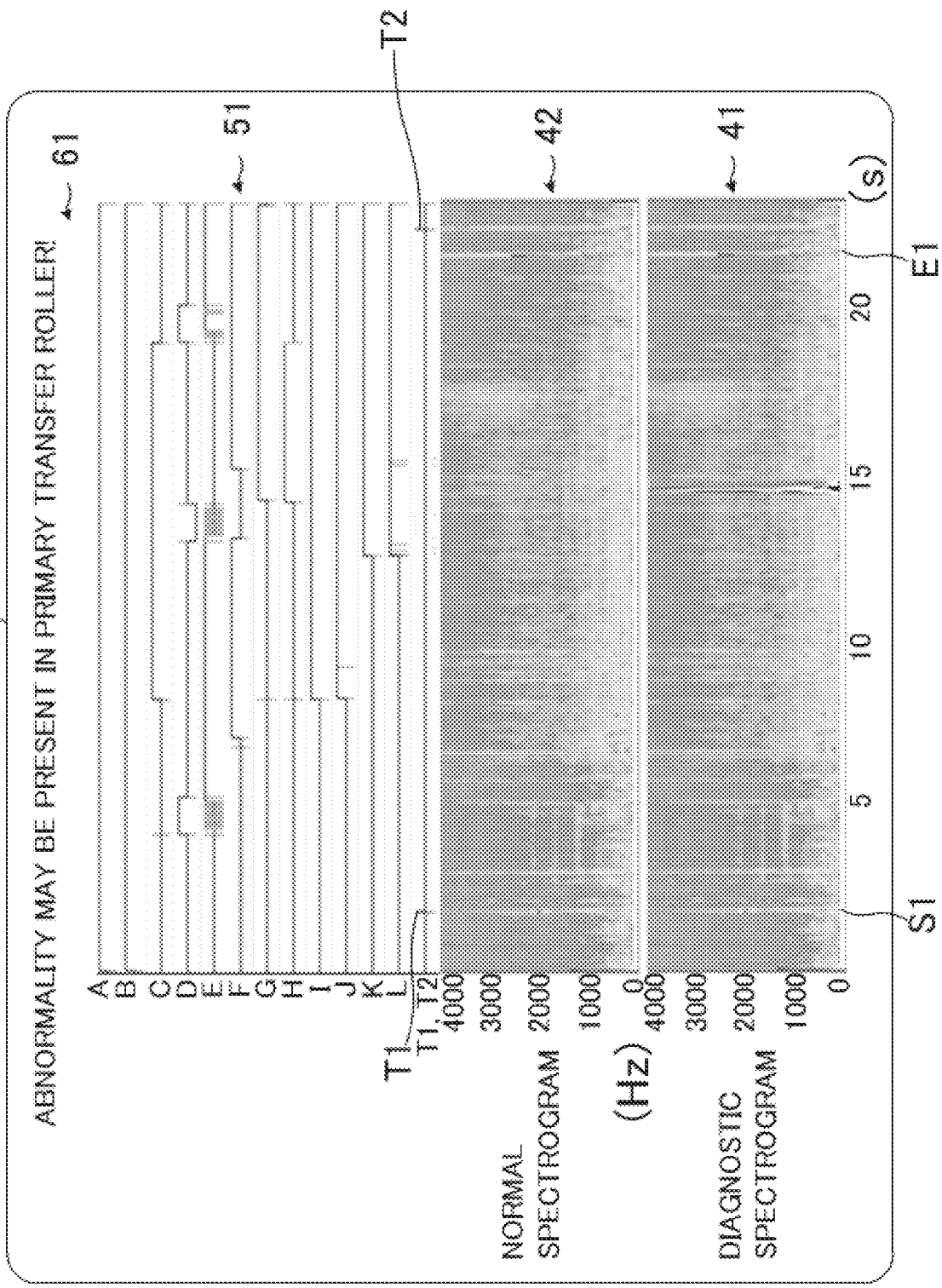
FIG. 6 is a view showing an example of a first screen.

FIGS. 3A and 3B show a flowchart showing abnormal noise diagnosis processing. FIG. 4 is a view showing an example of first identification processing. FIG. 5 is a view showing an example of second identification processing. FIG. 6 is a view showing an example of a first screen. A description will be given below of the operation of the image forming apparatus 1 during execution of the abnormal noise diagnosis processing with reference to FIGS. 3A to 6 and so on.

The controller 10 monitors the current time using a general clock function. When the current time equals a predetermined time, the controller 10 starts the execution of the abnormal noise diagnosis processing shown in FIGS. 3A and 3B. In this case, it is assumed that the controller 10 has set twelve midnight as the predetermined time. When starting the execution of the abnormal noise diagnosis processing, the controller 10 allows the noise collecting device 22 to start noise collection (step S10). After the processing in step S10, the controller 10 allows the sound output device 23 to output a starting sound represented by the starting sound data stored on the HDD 18 (step S11).

After the processing in step S11, the controller 10 allows the image forming device 12 and others to start the diagnostic image formation processing (step S12). After the processing in step S12, the controller 10 determines that the diagnostic image formation processing has not been completed, until the diagnostic image formation processing is completed (NO in step S13). When the diagnostic image formation processing is completed (YES in step S13), the controller 10 allows the sound output device 23 to output an ending sound represented by the ending sound data stored on the HDD 18 (step S14).

After the processing in step S14, the controller 10 allows the noise collecting device 22 to terminate noise collection (step S15). After the processing in step S15, the controller 10 subjects operating noise data output from the noise collecting device 22 to CWT conversion to acquire a diagnostic spectrogram (step S16). In this case, it is assumed that the controller 10 has acquired, as shown in FIG. 4, a diagnostic spectrogram 41 having a horizontal axis representing time (seconds) and a vertical axis representing frequency (Hz).

After the processing in step S16, the controller 10 executes, as shown in FIG. 4, first identification processing for identifying data in a time range from a starting sound S1 to an ending sound E3 in the diagnostic spectrogram 41 as a comparison target for data in a time range from a starting sound S2 to an ending sound E2 in a normal spectrogram 42 stored on the HDD 18 (step S17). By the first identification processing, the data on the diagnostic spectrogram 41 and the data on the normal spectrogram 42 to be compared with each other are matched in terms of width in the direction of the time axis.

After the processing in step S17, the controller 10 subtracts the data in the time range from the starting sound S2 to the ending sound E2 in the normal spectrogram 42 from the data in the time range from the starting sound S1 to the ending sound E1 in the diagnostic spectrogram 41 to calculate a difference in waveform height (frequency) between the diagnostic spectrogram 41 and the normal spectrogram 42 with a predetermined timing and calculates the absolute value of the difference (step S18). The predetermined timing is not particularly limited. However, in this case, it is assumed that the controller 10 calculates the absolute values of differences between the diagnostic spectrogram 41 and the normal spectrogram 42 with every timing.

After the processing in step S18, the controller 10 determines whether or not abnormal noise has occurred by determining whether or not at least one of the calculated absolute values of the differences is equal to or larger than a predetermined value (step S19). The predetermined value is not particularly limited. However, in this case, it is assumed that the controller 10 has set the predetermined value at 3 kHz.

(1) When Abnormal Noise Has Occurred

This case applies to the case where the absolute value of a difference is equal to or larger than 3 kHz with the timing when the waveform A appears in the diagnostic spectrogram 41. Thus, the controller 10 determines that abnormal noise has occurred (YES in step S19) and executes, as shown in FIG. 5, second identification processing for identifying the data in the time range from the starting sound 51 to the ending sound E1 in the diagnostic spectrogram 41 as a comparison target for data in a time range from the timing of start T1 to the timing of end T2 in the timing chart 51 stored on the HDD 18 (step S20). By the second identification processing, the data on the diagnostic spectrogram 41 and the data on the timing chart 51 to be compared with each other are matched in terms of width in the direction of the time axis.

After the processing in step S20, the controller 10 compares the data in the time range from the starting sound S1 to the ending sound E1 in the diagnostic spectrogram 41 with the data in the time range from the timing of start T1 to the timing of end T2 in the timing chart 51 to identify an operating body being a source of the abnormal noise (step S21). In this specific case, the controller 10 identifies, among the operation timings A to L shown in the timing chart 51, the operation timings G and H coinciding with the timing when the waveform A appears in the diagnostic spectrogram 41. The controller 10 identifies as sources of the abnormal noise the primary transfer rollers 123B, 123Y, 123C, and 123M which are operating bodies involved in the identified operation timings G and H, i.e., the timings of application of a transfer voltage.

After the processing in step S21, as shown in FIG. 6, the controller 10 allows the display device 15 to display a first screen 60 showing a message 61 indicating the identified sources of the abnormal noise (step S22). In doing so, the controller 10 allows the display device 15 to display, in the first screen 60, the timing chart 51, the normal spectrogram 42, and the diagnostic spectrogram 41 which are juxtaposed with the locations of the timing of start and the timing of end aligned with the locations of the starting sound and the ending sound, respectively.

After the processing in step S22, the controller 10 allows the HDD 18 to store the diagnostic spectrogram in association with information indicating the time and date of acquisition of the diagnostic spectrogram (step S23). After the processing in step S23, the controller 10 ends the abnormal noise diagnosis processing.

(2) When No Abnormal Noise Has Occurred

On the other hand, when all the calculated absolute values of differences are less than 3 kHz which is the predetermined value, the controller 10 determines that no abnormal noise has occurred (NO in step S19) and executes the processing in step S23 without allowing the display device 15 to display the first screen 60. After the processing in step S23, the controller 10 ends the abnormal noise diagnosis processing.

When neither starting sound nor ending sound is located in each of the diagnostic spectrogram and the normal spectrogram, it is difficult to determine which of a plurality of waveforms appearing in the normal spectrogram should be a comparison target for each of a plurality of waveforms appearing in a diagnostic spectrogram. In other words, when a plurality of waveforms of adjacent frequencies appear on the operating noise data, it is difficult to identify time ranges to be compared. This makes data comparison difficult and may prevent accurate determination of whether abnormal noise has occurred in the operating bodies and accurate identification of a source of the abnormal noise.

Unlike the above, in the above embodiment, the controller 10 allows the sound output device 23 to output a starting sound at the start of the diagnostic image formation processing and output an ending sound at the end of the diagnostic image formation processing. The controller 10 determines whether abnormal noise has occurred by identifying data in a time range from the starting sound S1 to the ending sound E1 in the diagnostic spectrogram 41 as a comparison target for data in a time range from the starting sound S2 to the ending sound E2 in the normal spectrogram 42 to match the diagnostic spectrogram 41 with the normal spectrogram 42 in terms of width in the direction of the time axis. Furthermore, the controller 10 identifies a source of the abnormal noise by identifying the data in the time range from the starting sound S1 to the ending sound E1 in the diagnostic spectrogram 41 as a comparison target for data in a time range from the timing of start T1 to the timing of end T2 in the timing chart 51 to match the diagnostic spectrogram 41 with the timing chart 51 in terms of width in the direction of the time axis.

Since, as just described, in the above embodiment, the locations of a starting sound and an ending sound are shown in each of the diagnostic spectrogram 41 and the normal spectrogram 42, the time ranges to be compared can be easily identified. Thus, the above determination and identification can be made with data sets for comparison matched in width in the direction of the time axis with each other. Therefore, even when a plurality of waveforms of adjacent frequencies appear on the operating noise data, accurate data comparison can be achieved. Hence, the determination of whether abnormal noise has occurred and the identification of a source of abnormal noise can be made with high accuracy.

Furthermore, in the above embodiment, when determining that abnormal noise has occurred, the controller 10 allows the display device 15 to display, in the first screen 60, the timing chart 51, the normal spectrogram 42, and the diagnostic spectrogram 41 which are juxtaposed with the location of the timing of start T1 aligned with the locations of the starting sounds S1, S2 and the location of the timing of end T2 aligned with the locations of the ending sounds E1, E2.

As just described, the timing chart 51, the normal spectrogram 42, and the diagnostic spectrogram 41 are displayed with their widths in the direction of the time axis matched with each other. Therefore, by checking the first screen 60, a maintenance staff for the image forming apparatus 1 can easily make a determination of whether abnormal noise has occurred and an identification of a source of abnormal noise.

In the above embodiment, when at least one of the absolute values of the differences between the diagnostic spectrogram 41 and the normal spectrogram 42 with every timing is equal to or larger than the predetermined value, the controller 10 determines that abnormal noise has occurred. On the other hand, when all the absolute values of the above differences are less than the predetermined value, the controller 10 determines that no abnormal noise has occurred. Thus, the controller 10 can more certainly detect the occurrence of abnormal noise.

In the above embodiment, the controller 10 subjects operating noise data to CWT conversion to acquire a diagnostic spectrogram. This makes data comparison easier and, therefore, a determination of whether abnormal noise has occurred and an identification of a source of abnormal noise can be made with higher accuracy.

In the above embodiment, after determining whether or not abnormal noise has occurred, the controller 10 allows the HDD 18 to store the diagnostic spectrogram in association with information indicating the time and date of acquisition of the diagnostic spectrogram. In this manner, diagnostic spectrograms in each of which a starting sound and an ending sound are depicted are accumulated on the HDD 18, which makes it possible to check them for any sign of abnormality backward. Alternatively, the controller 10 may allow the HDD 18 to store the diagnostic spectrogram in association with information indicating only the date of acquisition of the diagnostic spectrogram.

In the above embodiment, the image forming apparatus 1 includes the image forming device 12 and others including a plurality of operating bodies that execute the diagnostic image formation processing. Thus, the controller 10 can accurately detect abnormality having occurred in the image forming device 12 or others.

For example, in each of the techniques described in BACKGROUND, a determination of whether abnormal noise has occurred in operating bodies and an identification of a source of abnormal noise are made by comparing operating noise data representing operating noise input to a microphone with noise data or the like representing operating noise in a normal state. However, when a plurality of different waveforms representing different operating noise frequencies of the plurality of operating bodies appear in the operating noise data input to the microphone, it is difficult to determine which of a plurality of waveforms appearing in the noise data representing operating noise in the normal state should be a comparison target for each of the plurality of waveforms appearing in the input operating noise data. In other words, when a plurality of waveforms of adjacent frequencies appear on the operating noise data, it is difficult to identify time ranges to be compared. This makes data comparison difficult and may prevent accurate determination of whether abnormal noise has occurred in the operating bodies and accurate identification of a source of the abnormal noise. Unlike the above conventional techniques, in the above embodiment, a determination of whether abnormal noise has occurred and an identification of a source of abnormal noise can be made with high accuracy.

First Modification

Figure 7:
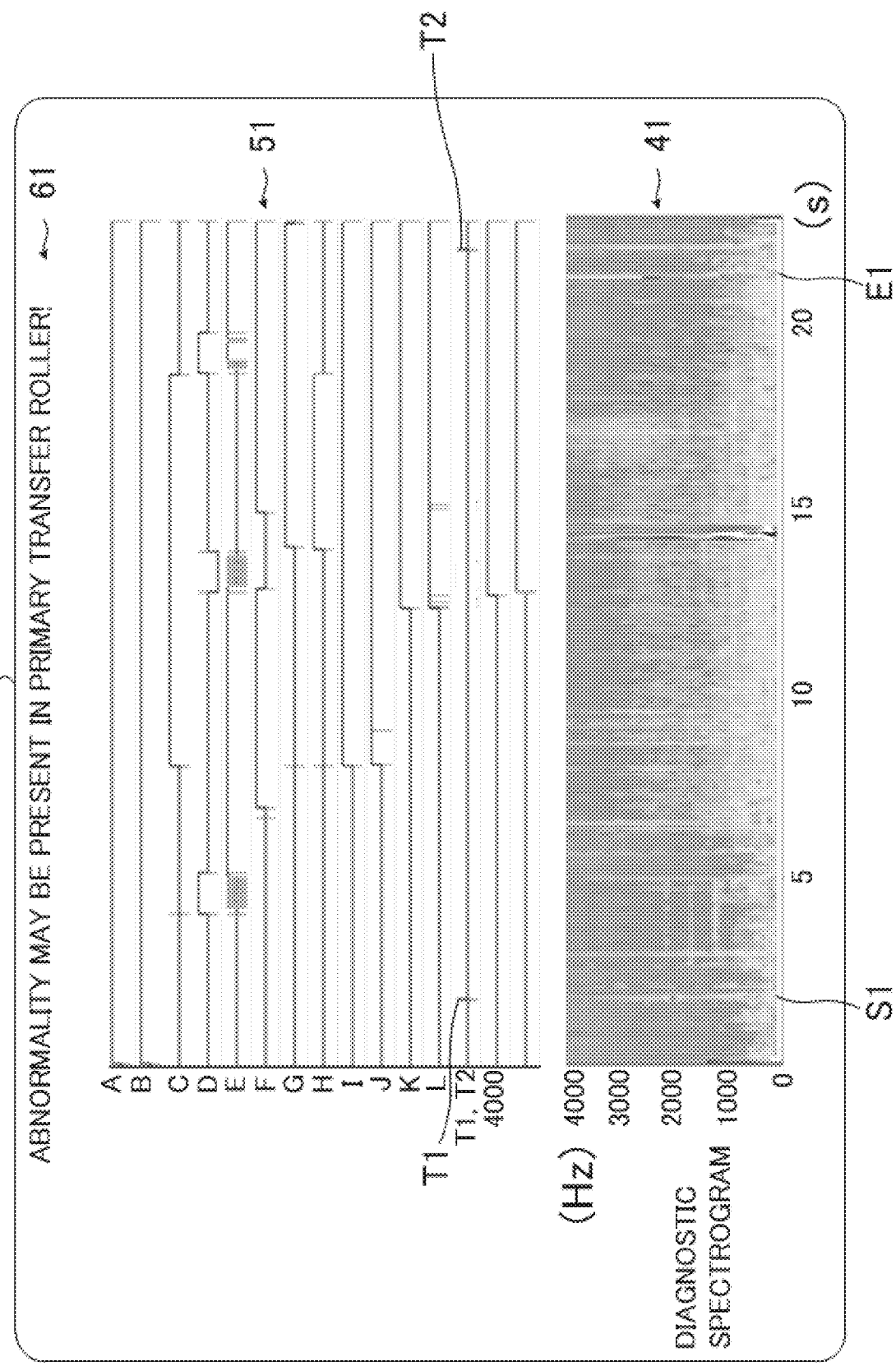
FIG. 7 is a view showing an example of a second screen.

In the above embodiment, when determining that abnormal noise has occurred, the controller 10 allows the display device 15 to display the first screen 60 containing the timing chart 51, the normal spectrogram 42, and the diagnostic spectrogram 41. However, the present disclosure is not limited to the manner described in the above embodiment. FIG. 7 is a view showing an example of a second screen.

For example, as shown in FIG. 7, the controller 10 may allow the display device 15 to display a second screen 70 containing the timing chart 51 and the diagnostic spectrogram 41 which are juxtaposed with the locations of the timing of start T1 and the timing of end T2 aligned with the locations of the starting sound S1 and the ending sound E1, respectively.

In the first modification, for example, a maintenance staff for the image forming apparatus 1 can easily identify a source of abnormal noise by checking the second screen 70.

Second Modification

Although in the above embodiment the controller 10 makes only a determination of whether or not abnormal noise, i.e., abnormality, has occurred, the present disclosure is not limited to the manner described in the above embodiment. The controller 10 may further determine whether or not a sign of occurrence of abnormal noise is present in the operating bodies of the image forming device 12 and others. For example, when the absolute value of the above difference is less than the predetermined value, but equal to or larger than another value (for example, 2 kHz) set lower than the predetermined value, the controller 10 determines that a sign of occurrence of abnormal noise is present in the operating bodies of the image forming device 12 and others and allows the display device 15 to display a screen showing the presence of a sign of occurrence of abnormal noise (or a screen shown a sign of abnormality).

In the second modification, even if the first screen 60 showing the occurrence of abnormality is not displayed on the display device 15, the screen showing a sign of abnormality is displayed on the display device 15. Therefore, although abnormality has not yet occurred in the image forming device 12 or others, the user can easily know the presence of a sign of abnormality.

Third Modification

Although in the above embodiment the controller 10 sets twelve midnight as the predetermined time, the present disclosure is not limited to the manner described in the above embodiment. The controller 10 may set the predetermined time within a time zone predetermined as a time zone within which the image forming apparatus 1 operates in a quiet state. The time zone within which the image forming apparatus 1 operates in a quiet state refers to a time zone during which the image forming apparatus 1 does not execute any of executable pieces of processing and within which noise is less likely to be generated.

Specifically, the controller 10 preferably sets the predetermined time, for example, at sometime during the overnight hours (for example, sometime between 6 p.m. and 6 a.m.) and particularly preferably at sometime during latenight hours (for example, sometime between 9 p.m. and midnight) or sometime during early morning hours (for example, sometime between 3 a.m. and 6 a.m.).

Thus, the abnormal noise diagnosis processing can be executed without interfering with the use of the image forming apparatus 1 by the user. In addition, users' conversation and the like can be prevented from being collected by the noise collecting device 22. Therefore, the abnormal noise diagnosis processing can be executed without breach of user privacy.

Other Modifications

Although in the above embodiment the controller 10 subjects operating noise data to CWT conversion to acquire a diagnostic spectrogram 41, the present disclosure is not limited to the manner described in the above embodiment. The controller 10 may acquire a diagnostic spectrogram 41 using another analysis method for subjecting the operating noise data to frequency analysis in the direction of the time axis.

Although in the above embodiment the controller 10 starts the execution of the abnormal noise diagnosis processing when the current time equals the predetermined time, the present disclosure is not limited to the manner described in the above embodiment. For example, the controller 10 may start the execution of the abnormal noise diagnosis processing when accepting an instruction to execute the abnormal noise diagnosis processing from the user or the maintenance staff through the operation device 16.

Although in the above embodiment the noise collecting device 22 is provided near the image forming device 12, the present disclosure is not limited to the manner described in the above embodiment. The noise collecting device 22 is sufficient to be provided at a location where the operating noise of the plurality of operating bodies can be collected. For example, the noise collecting device 22 may be provided near the sheet feed device 14 or near the fixing device 13.

Although in the above embodiment the controller 10 determines, based on a frequency difference between the diagnostic spectrogram 41 and the normal spectrogram 42 with the same timing, whether or not abnormal noise has occurred, the present disclosure is not limited to the manner described in the above embodiment. For example, when spectrograms are generated to vary the color of the waveform of a sound depending on the intensity of the sound, the controller 10 may determine, based on a color difference between the waveforms of spectrograms with the same timing, whether or not abnormal noise has occurred.

Although in the above embodiment the controller 10 determines whether or not abnormal noise has occurred by determining whether or not the absolute values of differences between the diagnostic spectrogram 41 and the normal spectrogram 42 are equal to or larger than the predetermined value, the present disclosure is not limited to the manner described in the above embodiment. For example, the controller 10 may determine whether or not abnormal noise has occurred by determining whether or not, among differences between the diagnostic spectrogram 41 and the normal spectrogram 42, differences indicating positive values are equal to or larger than the predetermined value.

Although in the above embodiment the controller 10 calculates the absolute values of differences between the diagnostic spectrogram 41 and the normal spectrogram 41 with every timing, the present disclosure is not limited to the manner described in the above embodiment. For example, the controller 10 may calculate, as the absolute value of a difference with a predetermined timing, the absolute value of a difference 15 seconds after the start of the diagnostic image formation processing.

In the above embodiment and the first modification, when determining that abnormal noise has occurred, the controller 10 allows the display device 15 to display the first screen 60 or the second screen 70. However, the present disclosure is not limited to the manners described in the above embodiment and first modification. For example, when additionally accepting a specification of the time and date of acquisition through the operation device 16, for example, from a maintenance staff, the controller 10 may read from the HDD 18 the diagnostic spectrogram 41 associated with the specified time and date of acquisition and allow the display device 15 to display the first screen 60 or the second screen 70 showing the read diagnostic spectrogram 41 and so on. Thus, the maintenance staff can easily see how the past abnormal noise was.

Although in the above embodiment the controller 10 allows the image forming device 12 and others to execute the diagnostic image formation processing as the predetermined processing, the present disclosure is not limited to the manner described in the above embodiment. For example, the controller 10 may allow the document conveyance device 6, the image reading device 11, and others, which execute diagnostic image reading processing for reading a predetermined document image and each of which includes a plurality of operating bodies, to execute the diagnostic image reading processing as the predetermined processing. Thus, the controller 10 can accurately detect abnormality having occurred in the document conveyance device 6, the image reading device 11 or others.

The present disclosure is not limited to the structure of the above embodiment and can be modified in various ways. For example, although in the above embodiment the image forming apparatus 1 serving as a multicolor multifunction peripheral is used as the electronic device, it is merely illustrative and any other image forming apparatus, such as a black-and-white multifunction peripheral, a copier or a facsimile machine, may be used.

Although in the above embodiment the image forming device 12 and others form an image on a recording paper sheet P, the present disclosure is not limited to the manner described in the above embodiment. The image forming device 12 and others may form an image on recording media other than a recording paper sheet. An example of the other recording media is an OHP (overhead projector) sheet.

The structure, configuration, and processing described in the above embodiment with reference to FIGS. 1 to 7 are merely illustrative and are not intended to limit the present disclosure to them.

While the present disclosure has been described in detail with reference to the embodiments thereof, it would be apparent to those skilled in the art the various changes and modifications may be made therein within the scope defined by the appended claims.

What is claimed is:

1. An electronic device comprising:
   a plurality of operating bodies that sequentially operate at predetermined time intervals to execute predetermined processing;
   a noise collecting device that collects operating noise of the plurality of operating bodies during execution of the processing and outputs operating noise data representing the collected operating noise;
   a storage device that previously stores a normal spectrogram representing operating noise of the plurality of operating bodies during execution of the processing in a predetermined normal condition, inclusive of a starting sound indicating a timing of start of the processing and an ending sound indicating a timing of end of the processing, and a timing chart showing operation timings of the plurality of operating bodies during normal execution of the processing, together with the timing of start of the processing and the timing of end of the processing;

a sound output device that outputs a sound;

a display device; and a control device that includes a processor and functions, through the processor executing a control program, as a controller that subjects the operating noise data to frequency analysis to acquire a spectrogram, determines whether or not abnormal noise has occurred based on a difference between the acquired spectrogram and the normal spectrogram with a predetermined timing, makes a comparison, upon determination that abnormal noise has occurred, between the acquired spectrogram and the timing chart to identify an operating body being a source of the abnormal noise, allows the display device to display a screen showing the identified source of the abnormal noise, and, upon determination that no abnormal noise has occurred, keeps the display device from displaying the screen, wherein the controller performs to: (i) allow the sound output device to output the starting sound at a start of the processing and output the ending sound at an end of the processing; (ii) determine whether or not abnormal noise has occurred by identifying data in a time range from the starting sound to the ending sound in the acquired spectrogram as a comparison target for data in a time range from the starting sound to the ending sound in the normal spectrogram to match the acquired spectrogram with the normal spectrogram in terms of width in a direction of a time axis; and (iii) identify the operating body being the source of the abnormal noise by identifying the data in the time range from the starting sound to the ending sound in the acquired spectrogram as a comparison target for data in a time range from the timing of start of the processing to the timing of end of the processing in the timing chart to match the acquired spectrogram with the timing chart in terms of width in the direction of the time axis.

2. The electronic device according to claim 1, wherein when determining that abnormal noise has occurred, the controller allows the display device to display, in the screen, the timing chart, the normal spectrogram, and the acquired spectrogram which are juxtaposed with locations of the timing of start and the timing of end aligned with locations of the starting sound and the ending sound, respectively.

3. The electronic device according to claim 1, wherein when determining that abnormal noise has occurred, the controller allows the display device to display, in the screen, the timing chart and the acquired spectrogram which are juxtaposed with locations of the timing of start and the timing of end aligned with locations of the starting sound and the ending sound, respectively.

4. The electronic device according to claim 1, wherein
when an absolute value of the difference with the predetermined timing is equal to or larger than a predetermined value, the controller determines that abnormal noise has occurred, and
when the absolute value of the difference is less than the predetermined value, the controller determines that no abnormal noise has occurred.

5. The electronic device according to claim 4, wherein when the absolute value of the difference with the predetermined timing is less than the predetermined value, but equal to or larger than a second value set lower than the predetermined value, the controller determines that a sign of occurrence of abnormal noise is present, and allows the display device to display a screen showing presence of the sign of occurrence of abnormal noise.

6. The electronic device according to claim 1, wherein the controller subjects the operating noise data to CWT (continuous wavelet transform) conversion to acquire the acquired spectrogram.

7. The electronic device according to claim 1, wherein after determining whether or not the abnormal noise has occurred, the controller allows the storage device to store the acquired spectrogram in association with information indicating a time and date of acquisition of the acquired spectrogram.

8. The electronic device according to claim 1, further comprising an image forming device including a plurality of operating bodies that execute, as the predetermined processing, image formation processing for forming a predetermined image on a recording medium.

* * * * *